US011429395B2

(12) United States Patent
Bentow

(10) Patent No.: US 11,429,395 B2
(45) Date of Patent: Aug. 30, 2022

(54) PERIPHERAL DEVICE SUPPORT IN THIN CLIENT ENVIRONMENTS

(71) Applicant: JPMORGAN CHASE BANK, N.A., New York, NY (US)

(72) Inventor: Brian Bentow, Foothill Ranch, CA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 309 days.

(21) Appl. No.: 16/733,122

(22) Filed: Jan. 2, 2020

(65) Prior Publication Data

US 2021/0208896 A1 Jul. 8, 2021

(51) Int. Cl.
| | | |
|---|---|---|
| G06F 9/00 | (2006.01) | |
| G06F 9/4401 | (2018.01) | |
| G06F 9/445 | (2018.01) | |
| G06F 11/36 | (2006.01) | |
| G06F 13/42 | (2006.01) | |
| G06Q 20/10 | (2012.01) | |
| H04L 9/40 | (2022.01) | |
| H04L 67/02 | (2022.01) | |
| H04L 67/141 | (2022.01) | |

(52) U.S. Cl.
CPC ............ *G06F 9/4401* (2013.01); *G06F 9/445* (2013.01); *G06F 11/3668* (2013.01); *G06F 13/4282* (2013.01); *G06Q 20/10* (2013.01); *H04L 63/0428* (2013.01); *H04L 67/02* (2013.01); *H04L 67/141* (2013.01); *G06F 9/44505* (2013.01); *G06F 2213/0042* (2013.01)

(58) Field of Classification Search
CPC .... G06F 9/4401; G06F 9/445; G06F 11/3668; G06F 13/4282; G06F 2213/0042; G06F 21/82; G06F 9/452; G06Q 20/10; H04L 63/0428; H04L 67/02; H04L 67/141
USPC .......................................................... 713/2
See application file for complete search history.

(56) References Cited

U.S. PATENT DOCUMENTS

| | | | |
|---|---|---|---|
| 7,505,455 B1 * | 3/2009 | Goodwin | .......... H04L 12/40052 370/356 |
| 9,256,393 B2 | 2/2016 | Ivashin et al. | |
| 10,462,228 B2 | 10/2019 | Vajravel et al. | |
| 10,489,311 B1 * | 11/2019 | Vajravel | .................. G06F 3/067 |
| 2007/0233869 A1 * | 10/2007 | Jodh | ....................... H04L 63/10 709/226 |
| 2007/0276763 A1 * | 11/2007 | Kleinman | ............ G06Q 20/202 705/64 |

(Continued)

OTHER PUBLICATIONS

International Search Report, dated Apr. 26, 2021, from corresponding International Application No. PCT/US2021/012072.

(Continued)

*Primary Examiner* — Volvick Derose
(74) *Attorney, Agent, or Firm* — Greenberg Traurig LLP

(57) ABSTRACT

Systems and methods for facilitating communication between a Human Interface Device (HID) and a remote resource such as, for example, an application provided by a virtual desktop. Embodiments relate to using one or more Application Programming Interfaces (APIs) to translate messages over a communication (COM) port tunnel, launching a program within the same session assigned to the COM port tunnel, utilizing client-side encryption, and redirecting HID messages to an embedded browser that is accessible over a virtual desktop.

20 Claims, 5 Drawing Sheets

(56) References Cited

U.S. PATENT DOCUMENTS

| | | | | |
|---|---|---|---|---|
| 2008/0005260 A1* | 1/2008 | Belimpasakis | H04L 67/04 | 709/212 |
| 2008/0168118 A1* | 7/2008 | Hickey | G06F 13/385 | 709/201 |
| 2009/0138631 A1* | 5/2009 | Hung | G06F 13/4291 | 710/48 |
| 2009/0282234 A1* | 11/2009 | Faraboschi | H04L 63/0272 | 713/2 |
| 2011/0205965 A1* | 8/2011 | Sprigg | G06F 9/4411 | 370/328 |
| 2013/0060905 A1* | 3/2013 | Mickens | H04L 67/025 | 709/219 |
| 2013/0072260 A1* | 3/2013 | Nair | G06F 13/102 | 455/566 |
| 2013/0111561 A1* | 5/2013 | Kaushik | H04L 63/10 | 726/4 |
| 2014/0128053 A1* | 5/2014 | Merchant | H04W 4/70 | 455/419 |
| 2014/0140258 A1* | 5/2014 | Sadeghi | H04L 47/30 | 370/312 |
| 2014/0280756 A1* | 9/2014 | Maity | H04L 67/06 | 709/219 |
| 2015/0186304 A1* | 7/2015 | Hulbert | G06F 13/102 | 710/10 |
| 2016/0150026 A1* | 5/2016 | Summers | H04L 67/2876 | 709/227 |
| 2016/0286003 A1* | 9/2016 | Pessis | G06F 9/541 | |
| 2017/0295243 A1 | 10/2017 | Kim | | |
| 2018/0054471 A1* | 2/2018 | Poe | H04L 67/141 | |
| 2019/0087359 A1* | 3/2019 | Litichever | G06F 13/4282 | |
| 2019/0327093 A1 | 10/2019 | Habraken | | |
| 2020/0053162 A1* | 2/2020 | Vajravel | G06F 9/452 | |
| 2020/0252472 A1* | 8/2020 | Vajravel | G06F 13/382 | |
| 2020/0389429 A1* | 12/2020 | Shribman | H04L 69/16 | |

OTHER PUBLICATIONS

Written Opinion of the International Searching Authority, dated Apr. 26, 2021, from corresponding International Application No. PCT/US2021/012072.

Citrix: COM Port Redirection: How to map a client COM port to a server COM port, Feb. 13, 2018, pp. 1-5.

Microsoft: System Services Updated, Feb. 6, 2009.

* cited by examiner

PERIPHERAL DEVICE SUPPORT IN THIN CLIENT ENVIRONMENTS

BACKGROUND OF THE INVENTION

1. Field of the Invention

Embodiments relate to supporting a Human Interface Device (HID) with applications provided at a thin client.

2. Description of the Related Art

A client device may operate as a thin client such that it executes an operating system that supports remotely executed functionality. For example, the thin client may execute a remote desktop where the services of an application are provided at the thin client but are executed remotely. From the user's perspective, it appears as if the applications are locally executed.

When an HID is connected to a thin client, the local device may communicate with the HID directly. However, a server providing application services to the thin client may have no access or limited access to the HID that is connected to the thin client. In this respect, a thin client may lack the ability for the redirection of at least some HIDs. For example, if the HID is connected to the thin client over a Universal Serial Bus (USB) connection, the thin client may lack support for USB redirection.

Some thin clients may support communication (COM) redirection. However, COM redirection alone may not allow some HIDs to communicate with applications executed remotely. In addition, some thin clients that purport to support USB redirection may provide poor support for USB redirection such that it is not reliable. For example, if a virtual desktop connection is intermittent, it may be the case that USB redirection support is stifled due to power cycling and the loss of a consistent network connection. Thus, an unreliable network connection or a network connection that has high latency may prevent optimal USB redirection support.

Furthermore, some applications provided at a remote desktop may embed a web browser. This adds an additional layer of separation between a HID and an application provided at a thin client that is executing remotely. For example, web browsers may not be able to access native Application Programming Interfaces (API) and/or access some HID ports that require one or more APIs.

SUMMARY OF THE INVENTION

Systems and methods for establishing communication between a Human Interface Device (HID) that is connected to a client device and a remotely executing resource. The remotely executing resource may be, for example, an application executing on a server or a web browser embedded in a server-side application.

Some embodiments are directed to facilitating communication between a HID connected to a client device and an embedded browser executing in at least one server. A bootstrap program may be launched in response to selecting a browser link of the embedded browser.

The bootstrap program may then initiate a mini device service. The mini device service may be configured to implement an Application Programming Interface (API) framework. A communication channel is established using an unsecure protocol over a communication (COM) port tunnel between the mini device service and a device service provided at a client device. A response is received from the HID over the communication channel and the response may be translated by the API framework. The response from the HID may then be received by the embedded browser for processing.

In some embodiments, the unsecure protocol is the hypertext transfer protocol (HTTP).

In some embodiments, the mini device service may generate an encryption key to encrypt communication over the communication channel. In this respect, client-side encryption may be used to increase security of communication over HTTP.

In some embodiments, a request may be sent from the mini device service to the device service to obtain a port number for a global unique identifier (GUID). The mini device service may monitor the communication channel for the response from the HID using the port number. The client device may also be configured to use COM port redirection to encapsulate the HID response for communication over the COM port tunnel.

In some embodiments, the mini device service is registered as being in the same user session as the user session of the COM port tunnel.

In some embodiments, the device service comprises a service to obtain a payment for completing a financial transaction. The HID may be a peripheral configured to receive a financial instrument for the payment. The embedded browser may be provided by the vendor to process the payment.

In some embodiments, the API framework may include a .NET API.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Exemplary embodiments will now be described in order to illustrate various features. The embodiments described herein are not intended to be limiting as to the scope, but rather are intended to provide examples of the components, use, and operation of the invention.

Figure 1:
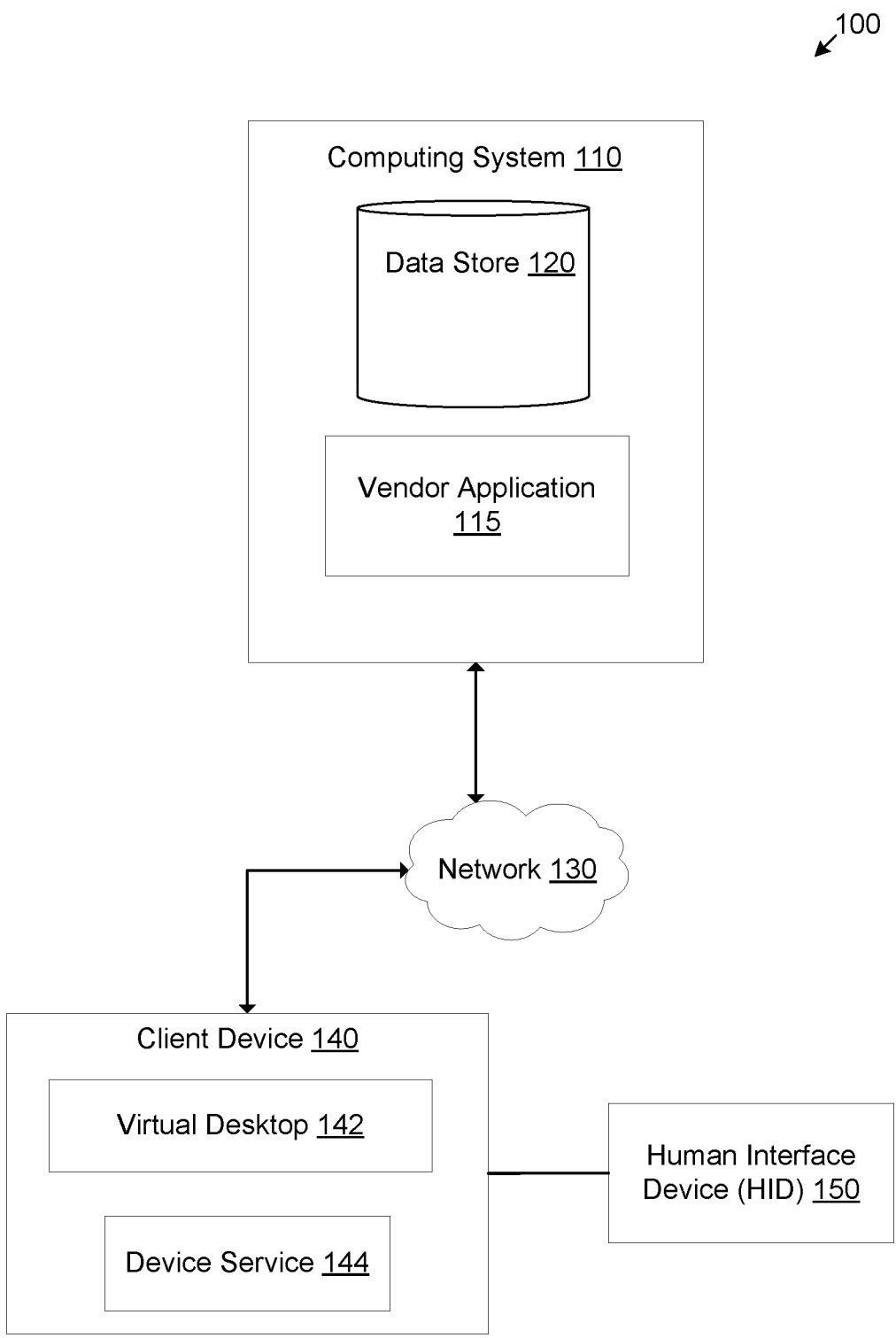
FIG. 1 is a drawing of a networked environment according to various embodiments.

FIG. 1 shows a networked environment 100 according to various embodiments. The networked environment 100 includes a computing system 110 that may be made up of a combination of hardware and software. The computing system 110 includes software programs that may execute in the computing system 110 such as, for example, a vendor application 115. The computing system 110 may also include a data store 120. The computing system 110 may be connected to a network 130 such as the Internet, intranets, extranets, wide area networks (WANs), local area networks (LANs), wired networks, wireless networks, or other suitable networks, etc., or any combination of two or more such networks. Communication channels may be established over the network 130 between two endpoints.

The computing system 110 may comprise, for example, a server computer or any other system providing computing capability. Alternatively, the computing system 110 may employ a plurality of computing devices that may be arranged, for example, in one or more server banks or computer banks or other arrangements. Such computing devices may be located in a single installation or may be distributed among many different geographical locations. For example, the computing system 110 may include a plurality of computing devices that together may comprise a hosted computing resource, a grid computing resource and/or any other distributed computing arrangement. In some cases, the computing system 110 may correspond to an elastic computing resource where the allotted capacity of processing, network, storage, or other computing-related resources may vary over time. The computing system 110 may implement one or more virtual machines that use the resources of the computing system 110. Various software components may be executed on one or more virtual machines.

Various applications and/or other functionality may be executed in the computing system 110 according to various embodiments. Also, various data may be stored in the data store 120 or other memory that may be accessible to the computing system 110. The data store 120 may represent one or more data stores 120. The data store 120 may be a database. The data store 120 may be used to store data processed or handled by the vendor application 115 or data that may be processed or handled by other applications executing in the computing system 110.

The vendor application 115 may include software managed by a vendor to generate bills or invoices to customers. The vendor application may solicit payments from customers. The vendor application 115 may be any application such as, for example, an enterprise application that may need to communicate with peripheral devices connected to local client devices.

The networked environment 100 further includes one or more client devices 140. A client device may be a local workstation. A client device 140 allows a user to interact with the components of the computing system 110 over the network 130. A client device 140 may be, for example, a cell phone, laptop, personal computer, mobile device, or any other computing device used by a user. The client device 140 may be considered a thin client such that it includes a hardware platform that supports an operating system to provide a virtual desktop 142. A virtual desktop 142 may be executed at the client device 142, however, the virtual desktop supports applications executing remotely. Thus, the user of the client device 140 interacts with the virtual desktop 142 locally, while applications provided at the client device 140 execute remotely. The virtual desktop 142 may be considered a "remote desktop" that provides a remotely executed operating system that supports remote applications. A remote server provides a virtual desktop environment that may include an operating system and other applications or services executing remotely from the client device 140.

The client device 140 may include a device service 144. The device service 144 may be a software program that is installed and that executes locally on the client device 140. In some embodiments, the device service 144 may be a payment application configured to obtain a customer payment and convey it to the vendor application 115. In some embodiments, the device service 144 may be integrated with the vendor application 115. For example, the device service 144 may be a bill pay module that interfaces with the vendor application 115.

The client device 140 may be connected to a Human Interface Device (HID) 150. The HID 150 may be physically or virtually coupled to the client device 140. In some embodiments, the HID may be plugged into a Universal Serial Bus (USB) port of the client device 140 so that client device 140 and HID 150 communicate over USB at a local level.

The HID 150 may be a device that receives a financial instrument as a method of payment. For example, the HID 150 may be a card reader, or check scanner for obtaining payment via credit card, debit card, bank card, gift card, or any other financial instrument. The HID 150 may include a scanner/reader to obtain payment via QR code, bar code, magnetic strip, RFID, or other mechanism to receive payment. The HID 150 may comprise a check scanner, a card reader or a combination thereof. A card reader may also support user inputs such as swiping a card, tapping a card, and/or keyed transactions using a keypad or touch screen.

Figure 2:
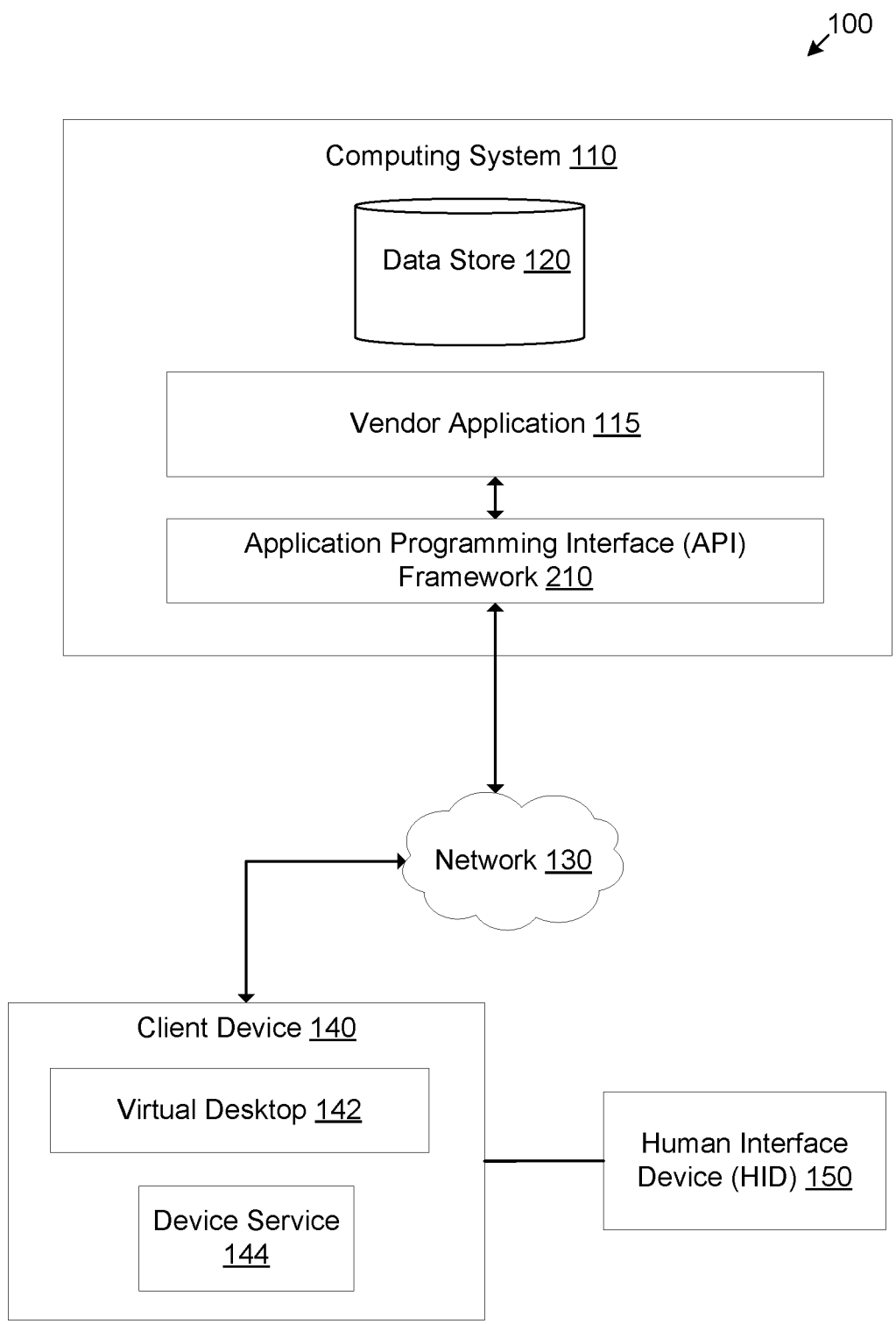
FIG. 2 is a drawing of a networked environment supporting HID communication with a remote application according to various embodiments.
Figure 3:
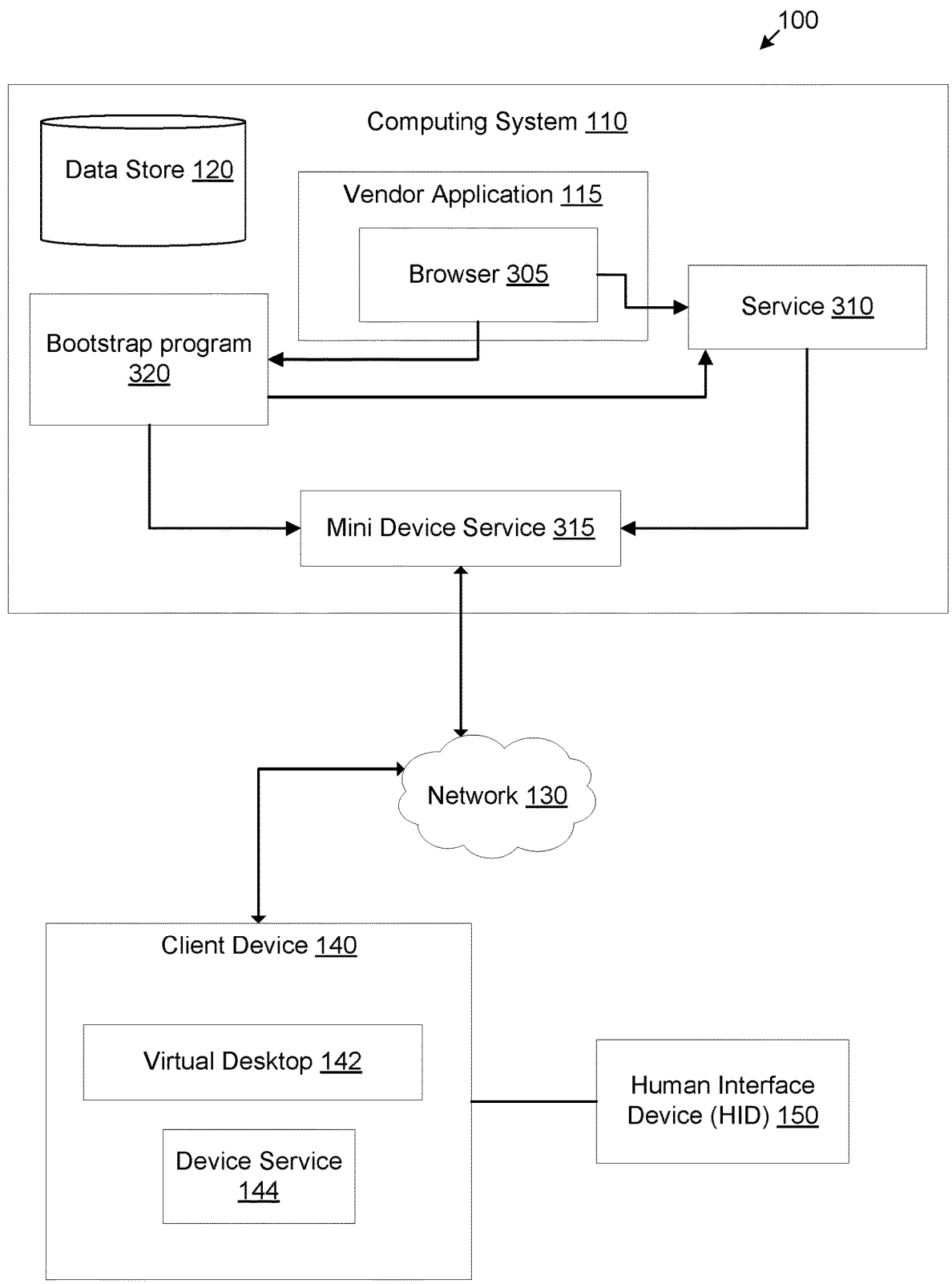
FIG. 3 is a drawing of a networked environment supporting HID communication with an embedded browser according to various embodiments.

In the networked environment 100, a user may wish to submit a payment to the vendor application 115 using the HID 150. The device service 144 may communicate with the HID 150 to receive payment and convey that payment to the vendor application 115. While examples may refer to making payments, embodiments encompass any communication between the HID 150 and other components in the networked environment 100. FIGS. 2 and 3 provide various embodiments for establishing communication between the HID 150 and the vendor application 115.

FIG. 2 is a drawing of a networked environment 100 supporting HID communication with a remote application according to various embodiments. FIG. 2 provides an example of an embodiments that allows a HID 150 to communicate with the vendor application 115. Specifically, the computing system 110 includes an API framework 210. The API framework may include a collection of APIs that provide definitions of subroutines and protocols for allowing two components to interface with each other. In some embodiments, the API framework 210 comprises a .NET API that provides customized APIs to allow communication between the HID 150 and vendor application 115. The API framework 210 may be embedded in the vendor application 115.

In some embodiments, the client device 140 supports COM port redirection but may not fully support USB redirection. In this example, there may be no native support to allow a USB-based HID 150 to communicate with the vendor application 115. The client device 140 may establish a COM port tunnel over COM port redirection. The COM port tunnel is a communication channel over a network 130 between two endpoints. The COM port tunnel may be established as part of the same session as the virtual desktop 142.

The vendor application 115 executing on the computing system 110 may connect as one COM port tunnel endpoint while the device service 144 executing on the client device 140 may connected as the other COM port tunnel endpoint.

A user may access the vendor application 115 on the client device 150. The vendor application 115 may intend to communicate with a HID 150. For example, if the user wishes to make a payment using a HID 150, the user may provide an input to the vendor application 115 before making a payment. For example, the user may select a swipe button. In response, the vendor application 115 may send a first message to the API framework 210. The first message may be request to receive data from the HID 150. The API framework 210 may translate the first message into a second message and sends the second message to the device service 144 over the COM port tunnel.

The second message received by the device service 144 may be translated into a third message that may be sent from the device service 144 executing on the client device 140 to the HID 150, where the HID is connected to the client device 140 as a peripheral device. The HID 150 may receive the third message and generate a fourth message. The fourth message may be a response to the first message originated by the vendor application 115.

The fourth message may be sent to the device service 144. The device service 144 may translate the fourth message to a fifth message and send the fifth message to the API framework 210 over the COM port tunnel. The API framework 210 may translate the fifth message into a sixth message and transmit the sixth message to the vendor application 115. Thus, the vendor application 115 communicates with the HID 150 via the API framework 210.

As discussed in the example above, the API framework 210 is configured to translate communication between the vendor application 115 and the HID 150 that takes place over a COM port tunnel. The API framework 210 may be configured to encapsulate messages transmitted over the COM port tunnel. For example, the API framework 210 may implement a TCP/IP protocol over the COM port tunnel using, for example, a 4 k buffer communication channel Messages transmitted over the COM port tunnel may comprise data packets formatted according to a protocol that may then be encapsulated by a different packet according to a protocol used by the COM port tunnel.

The use of the COM port tunnel allows the API framework 210 to translate data to and from the HID so that it may be handled by the vendor application 115.

FIG. 3 is a drawing of a networked environment 100 supporting HID communication with an embedded browser according to various embodiments. In some embodiments, the vendor application 115 may comprise a browser 305. The browser 305 may be embedded into another browser or application that is provided at the client device 140. The browser 305 may render a user interface to interact with the HID 150. For example, the browser 305 may allow a user to make a selection for payment via the HID 150.

The browser 305 may communicate with a service 310. The service 310 may be a windows service that executes on a remote server that provides the virtual desktop environment. The service 310 may run as a background application of an operating system in the virtual desktop environment. The service 310 may provide an HTTPS interface for the embedded browser 305.

The service 310 may execute on the computing system 110 as a local admin in a first session (i.e., session 0). For example, an operating system registers each application to a corresponding session.

The device service 144 may also execute on the client device 140 while using a COM port to receive messages with other remote services such as, for example, the mini device service 315. The device service 144 may use a secure protocol such as, for example, HTTPS.

When a user of the client device 140 logs into a virtual desktop 142, they are assigned a second session (i.e., session 1). When establishing a COM port tunnel to operate with the virtual desktop 142, the COM port tunnel may only be made available to applications assigned to the second session. Thus, the service 310 that may be assigned to the first session may not be able to utilize the COM port tunnel because it may be assigned to a different session.

To address this, the computing system 110 may further include a mini device service 315. The mini device service 315 may be a program or application that executes separately from the service 310. The mini device service 315 may be configured to execute as part of the second session so it may utilize the COM port tunnel, which may be assigned to the second session. In this respect, the mini device service 315 may be able to access a redirected COM port to facilitate communication with the HID 150. The mini device service 315 may include the API framework 210 to translate messages over the COM port tunnel.

The mini device service 315 may communicate over the COM port tunnel with the device service 144 over an unsecure protocol such as, for example, HTTP.

To compensate for using an unsecure protocol, the mini device service 315 may encrypt messages communicated over the COM port tunnel using client-side encryption. For example, the mini device service 315 may use public-private key encryption to ensure that communication is secure even through the protocol is not secure.

The computing system 110 may also include a bootstrap program 320. the bootstrap program 320 may launch the mini device service 315, thereby initiating it. Moreover, the mini device service 315 may be initiated so that it is assigned to the second session that is associated with the virtual desktop session and COM port tunnel.

The browser 305 may include a link that causes the bootstrap program 320 to be launched upon selecting the link. The bootstrap program may be launched via an iframe associated with the browser 305. The bootstrap program 320 then initiates the mini device services 315 so that it may be associated with the second session.

Once the mini device service 315 is initiated, communication with the HID 150 may be translated by the mini device service 315 as discussed in the example of FIG. 2. For example, the mini device service 315 may use an API framework 210 to translate messages between endpoints.

Figure 4:
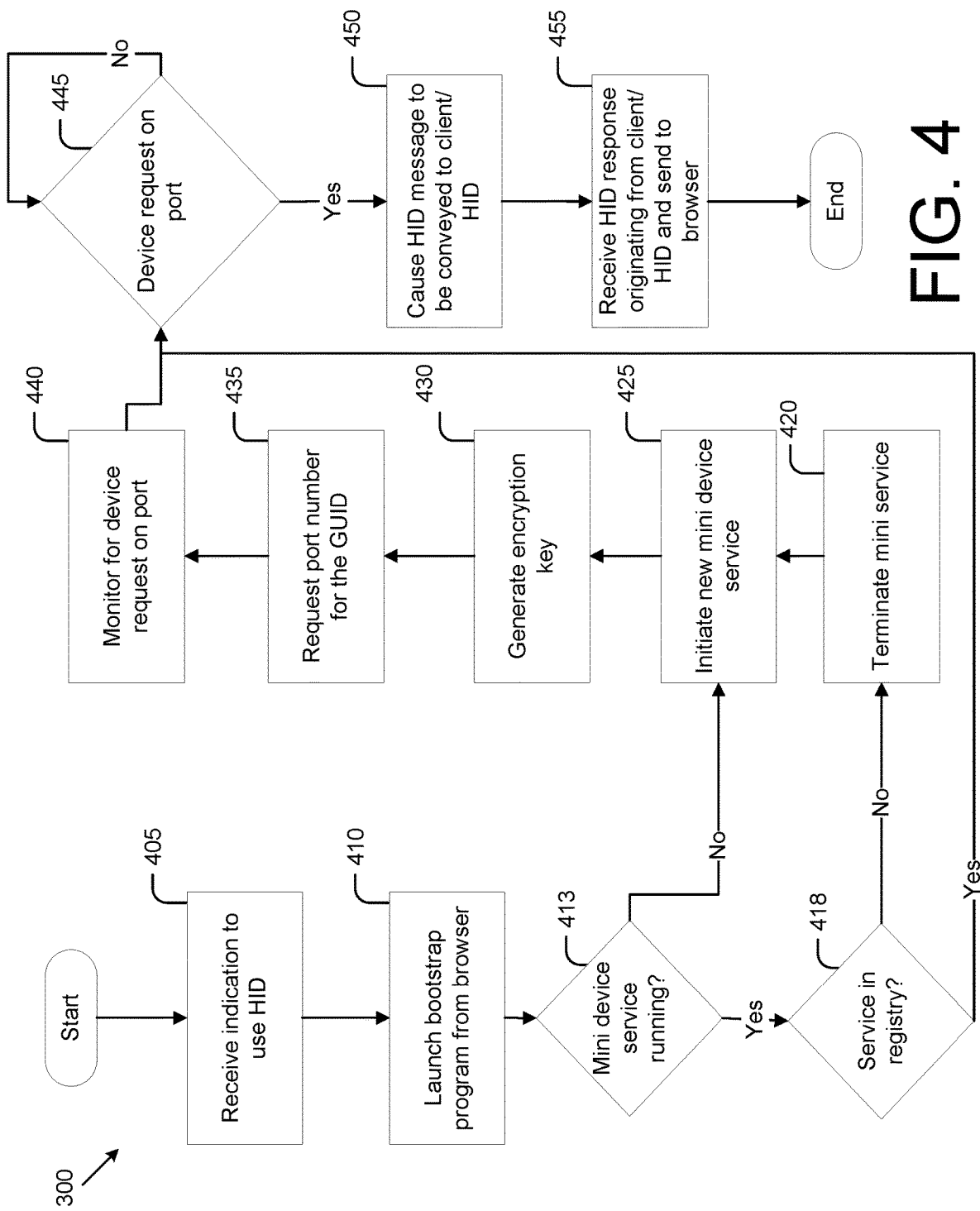
FIG. 4 is a flowchart illustrating an example of establishing communication with a HID in a networked environment of FIG. 1 according to various embodiments.

FIG. 4 is a flowchart illustrating an example of establishing communication with a HID in a networked environment 100 of FIG. 1 according to various embodiments. It is understood that the flowchart of FIG. 4 provides merely an example of the many different types of functional arrangements that may be employed to implement the operation of the portion of the computing system 110 as described herein. The flowchart of FIG. 4 may also be viewed as depicting an example of a method 400 implemented in the networked environment 100 of FIG. 1 according to one or more embodiments.

The method 400 may be performed by one or more software programs executing on the computing system 110 and executing remotely from the client device. The software program may include and/or communicate with several software components such as, for example, a service 310, a mini device service 315, and a bootstrap program 320. Thus, the software program may implement an environment of several interconnected components that may be launched throughout the execution of the software program.

At item 405, the software program may receive an indication to use a HID. In this example, a client device executes a virtual desktop which allows a user to access various applications remotely. For example, the user may access a vendor application for making a payment using a HID. The vendor application may include an embedded browser that implements a vendor's payment system. Through the virtual desktop, a user may access the embedded browser and provide input indicating an instruction or command to use a HID, where the HID is locally connected to the client device.

In addition, a COM port tunnel may be created after the launching the virtual desktop so that the COM port tunnel and virtual desktop are assigned to the same session.

At item 410, the software program may launch a bootstrap program from the browser. The bootstrap program may be registered to a custom protocol Universal Resource Locator (URL) which, when selected, may initiate an application. The bootstrap program may be launched in response to a user clicking a link in the embedded browser.

At item 413, the bootstrap program may check if a mini device service is running. At 418, if a mini device service is running, the software program may check if the mini device service is in a registry. The bootstrap program may check if the mini device service is using a global unique identifier (GUID) as an argument. The bootstrap program may check if the mini device service is assigned to the same session as the session assigned to the COM port tunnel.

At item 420, if a mini device service is not in the registry, the software program may terminate it. A mini device service having a particular GUID or session identifier that is not associated with a COM port tunnel may be terminated. A mini device service that is executing but not in a registry may be considered a zombie service that should be terminated before instantiating a new mini device service.

At item 425, the software program may initiate a new mini device service. For example, the bootstrap program may initiate the mini device service so that it executes in the same session as the COM port tunnel.

At item 430 the software program may generate one or more encryption keys. The mini device service may generate an encryption key. The one or more encryption keys may be, for example, an RSA key pair. The encryption keys may be used to encrypt data transmitted over an HTTP port. The mini device service may generate a public private key pair upon it being instantiated. The public key may be transmitted to a service executing in the background of the virtual desktop operating system.

At item 435, the software program may request a port number for the GUID. For example, the mini device service may obtain information about the COM port tunnel to facilitate communication over it. Information about the COM port tunnel may be received from a device service executing on the client device. The software program may store the port number or other information about the port that is assigned to the GUID.

At item 440, the software program monitors for device request on the port. The mini device service may use an HTTP listener to detect whether there is communication originating from the HID. A device request may be an indication of using the HID. For example, a user may provide a user input selection to swipe or tap a card to initiate a payment transaction.

At item 445, the software program waits for a device request on the port. The device request may originate from the embedded browser.

At item 450, upon receiving a device request, the software program causes a HID message to be conveyed to the client device or HID. For example, the HID message may be transmitted from the mini device service to the device service over the COM port tunnel. The HID message may be encrypted using a public/private key pair. The device service executing on the client device may transmit the HID message to the HID over a local connection.

At item 455, the software program receives the HID response originating from the HID or client device and sends the HID response to the browser. For example, the HID may generate a response that is sent to the client device through a local connection. The device service executing on the client device may receive the HID response and transmit it to the mini device service over the COM port tunnel.

The mini device service may communicate the HID response to the embedded browser. For example, a service executing on top of the virtual desktop operating system may allow the mini device service 315 to communicate with the embedded browser 305.

Figure 5:
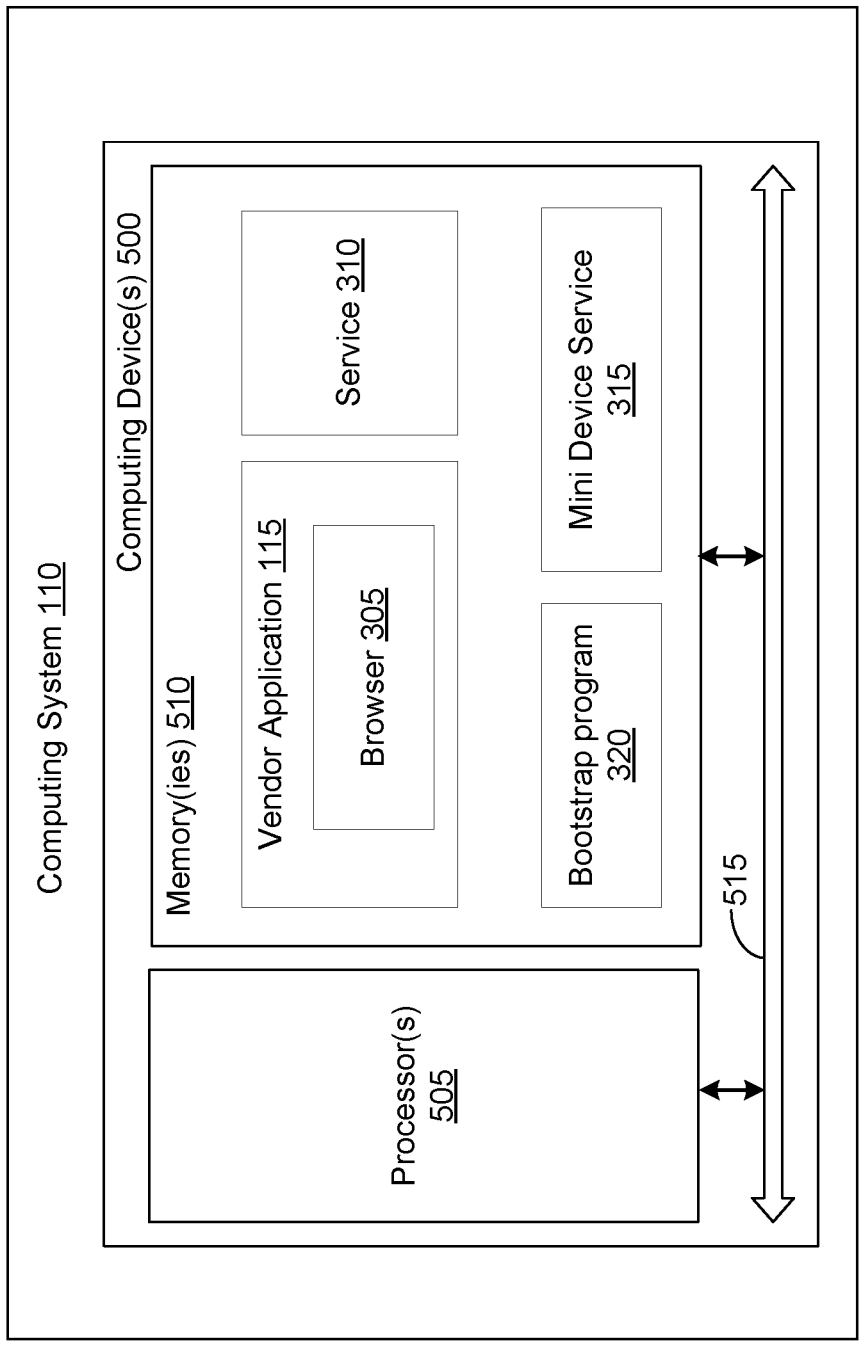
FIG. 5 is a schematic block diagram of an example of a computing system in the networked environment according to various embodiments.

FIG. 5 is a schematic block diagram of an example of a computing system 110 in the networked environment 100 according to various embodiments.

The computing system 110 may comprise one or more computing devices 500. A computing device 500 may be a remote server. The computing device includes at least one processor circuit, for example a processor 505, and memory 510, both of which may be coupled to a local interface 515 or bus. The local interface 515 may comprise a data bus with an accompanying address/control bus or other bus structure.

Data and several components may be stored in memory 510. The data and several components may be accessed and/or executable by the processor 505. The vendor application 115, browser 305, service 310, mini device service 315, and bootstrap program 320 may be stored/loaded in memory 510 and executed by the processor 505. Other applications may be stored in memory 510 and may be executable by processor 505. Any component discussed herein may be implemented in the form of software, any one of a number of programming languages may be employed, for example, C, C++, C#, Objective C, Java®, JavaScript®, Perl, PHP, Visual Basic®, Python®, Ruby, or other programming languages.

Several software components may be stored in memory 510 and may be executable by processor 505. The term "executable" may be described as a program file that may be in a form that may ultimately be run by processor 505. Examples of executable programs may be, a compiled program that may be translated into machine code in a format that may be loaded into a random access portion of memory 510 and run by processor 505, source code that may be expressed in proper format such as object code that may be capable of being loaded into a random access portion of memory 510 and executed by processor 505, or source code that may be interpreted by another executable program to generate instructions in a random access portion of memory 510 to be executed by processor 505, and the like. An executable program may be stored in any portion or component of memory 510, for example, random access memory (RAM), read-only memory (ROM), hard drive, solid-state drive, USB flash drive, memory card, optical disc such as compact disc (CD) or digital versatile disc (DVD), floppy disk, magnetic tape, or any other memory components.

The memory 510 may be defined as including both volatile and nonvolatile memory and data storage components. Volatile components may be those that do not retain data values upon loss of power. Nonvolatile components may be those that retain data upon a loss of power. Memory 510 may comprise random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. Embodiments, RANI may comprise static random-access memory (SRAM), dynamic random access memory (DRAM), or magnetic random access memory (MRAM) and other such devices. Embodiments, ROM may comprise a programmable read-only memory (PROM), an erasable programmable read-only memory (EPROM), an electrically erasable programmable read-only memory (EEPROM), or other like memory device.

The processor 505 may represent multiple processors 505 and/or multiple processor cores and memory 510 may represent multiple memories 510 that may operate in parallel processing circuits, respectively. The local interface 515 may be an appropriate network that facilitates communication between any two of the multiple processors 505, between any processor 505 and any of the memories 510, or between any two of the memories 510, and the like. The local interface 515 may comprise additional systems designed to coordinate this communication, for example, performing load balancing. The processor 505 may be of electrical or other available construction.

The memory 510 stores various software programs. These software programs may be embodied in software or code executed by hardware as discussed above, as an alternative the same may also be embodied in dedicated hardware or a combination of software/hardware and dedicated hardware. If embodied in dedicated hardware, each may be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, and the like. Technologies may generally be well known by those skilled in the art and, consequently, are not described in detail herein.

The operations described herein may be implemented as software stored in computer-readable medium. Computer-readable medium may comprise many physical media, for example, magnetic, optical, or semiconductor media. Examples of a suitable computer-readable medium may include, but are not limited to, magnetic tapes, magnetic floppy diskettes, magnetic hard drives, memory cards, solid-state drives, USB flash drives, or optical discs. Embodiments, computer-readable medium may be a random-access memory (RAM), for example, static random-access memory (SRAM) and dynamic random access memory (DRAM), or magnetic random access memory (MRAM). Computer-readable medium may be a read-only memory (ROM), a programmable read-only memory (PROM), an erasable programmable read-only memory (EPROM), an electrically erasable programmable read-only memory (EEPROM), or other type of memory device.

Any logic or application described herein, including the vendor application 115, browser 305, service 310, mini device service 315, and bootstrap program 320 may be implemented and structured in a variety of ways. One or more applications described may be implemented as modules or components of a single application. One or more applications described herein may be executed in shared or separate computing devices or a combination thereof. For example, the software application described herein may execute in the same computing device 500, or in multiple computing devices.

Disjunctive language such as the phrase "at least one of X, Y, or Z," unless specifically stated otherwise, is understood with the context as used in general to present that an item, term, and the like, may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments described herein are merely possible examples of implementations set forth for a clear understanding of the principles of the disclosure. Many variations and modifications may be made to the above-described embodiment(s) without departing substantially from the spirit and principles of the disclosure.

What is claimed is:

1. A computer-implemented method for facilitating communication between a human interface device (HID) connected to a client device and an embedded browser executing in at least one server, the method comprising the steps of:
    launching, by a computer program executed by the at least one server, a bootstrap program in response to selecting a browser link of the embedded browser;
    initiating, by the bootstrap program, a mini device service configured to implement an Application Programming Interface (API) framework;
    establishing, by the computer program, a communication channel using an unsecure protocol over a communication (COM) port tunnel between the mini device service and a device service provided at a client device; and
    receiving, by the computer program, a response from the HID over the communication channel, the response being translated by the API framework;
    wherein the response from the HID is received by the embedded browser for processing.

2. The method of claim 1, wherein the unsecure protocol is the hypertext transfer protocol (HTTP).

3. The method of claim 1, further comprising the step of generating an encryption key by the mini device service to encrypt communication over the communication channel.

4. The method of claim 1, further comprising the step of sending a request from the mini device service to the device service to obtain a port number for a global unique identifier (GUID).

5. The method of claim 4, further comprising the step of monitoring by the mini device service for the response from the HID using the port number.

6. The method of claim 1, wherein the HID is connected to the client device over a Universal Serial Bus (USB) connection.

7. The method of claim 6, wherein the client device is configured to use COM port redirection to encapsulate the HID response for communication over the COM port tunnel.

8. The method of claim 1, wherein the mini device service is registered as being in the same user session as the user session of the COM port tunnel.

9. The method of claim 1, wherein the device service comprises a service to obtain a payment to complete a financial transaction, wherein the HID is a peripheral configured to receive a financial instrument for the payment, wherein the embedded browser is to process the payment.

10. The method of claim 1, wherein the API framework comprises a .NET API, wherein the .NET API is embedded within a vendor application.

11. The method of claim 10, further comprising monitoring by the mini device service for the response from the HID using a port number.

12. The method of claim 1, wherein the API framework comprises a .NET API, wherein the .NET API is embedded within a vendor application.

13. A method for testing software, comprising in an information processing apparatus comprising at least one computer processor:
    initiating, by a computer program executed on at least one server, a mini device service that implements an Application Programming Interface (API) framework, wherein the mini device service is registered as being in the same user session as the user session of a communication COM port tunnel that is provided at a thin client executed on a client device, wherein the thin client is connected to a human interface device (HID);
    establishing, by the computer program, a communication channel using the hypertext transfer protocol (HTTP) over the COM port tunnel between the mini device service and a device service provided at the thin client; and
    receiving, by the computer program, a response from the HID over the communication channel, the response being translated by the API framework;
    wherein the response from the HID is received for processing by an embedded browser executing in the at least one server.

14. The method of claim 13, wherein the embedded browser comprises a browser link, which, upon selection of the browser link, the mini device service is initiated.

15. The method of claim 13, further comprising generating an encryption key by the mini device service to encrypt communication over the communication channel.

16. The method of claim 13, further comprising sending a request from the mini device service to the device service to obtain a port number for a global unique identifier (GUID).

17. The method of claim 13, wherein the HID is connected to the thin client over a Universal Serial Bus (USB) connection.

18. The method of claim 17, wherein the thin client is configured to use COM port redirection to encapsulate the HID response for communication over the COM port tunnel.

19. The method of claim 13, wherein the device service comprises a service to obtain a payment to complete a financial transaction, wherein the HID is a peripheral configured to receive a financial instrument for the payment, wherein the embedded browser to process the payment.

20. The method of claim 13, further comprising launching a bootstrap program in response to selecting a browser link of the embedded browser, wherein the bootstrap program is configured to initiate the mini device service.

* * * * *